United States Patent [19]

Acker

[11] 4,366,806
[45] Jan. 4, 1983

[54] SOLAR POOL HEATER

[75] Inventor: Loren C. Acker, Tucson, Ariz.

[73] Assignee: Engineering & Research Assocs., Inc., Tucson, Ariz.

[21] Appl. No.: 179,014

[22] Filed: Aug. 18, 1980

[51] Int. Cl.³ ............................ F24J 3/02; E04H 3/19
[52] U.S. Cl. ........................................ 126/415; 4/498
[58] Field of Search .................. 126/415, 416, 450; 4/498, 499, 503; 220/216, 218, 219, 227; 9/8 R, 2 A, 11 A

[56] References Cited

U.S. PATENT DOCUMENTS

| | | | |
|---|---|---|---|
| 3,694,837 | 10/1972 | Von Norring | 9/8 R X |
| 3,872,522 | 3/1975 | Bennett et al. | 4/498 |
| 3,938,338 | 2/1976 | Cullen | 220/218 X |
| 4,146,015 | 3/1979 | Acker | 126/415 |
| 4,222,366 | 9/1980 | Acker | 126/415 |
| 4,270,232 | 6/1981 | Ballem | 4/498 |

Primary Examiner—Larry Jones
Attorney, Agent, or Firm—Cahill, Sutton & Thomas

[57] ABSTRACT

A stackable solar pool heater is formed of a semi-rigid self-cleaning centrally raised aerodynamically response membrane which membrane includes a depending integral perimeter. Flotation elements, providing a flotation ratio of approximately two to one, are secured periodically about the perimeter to maintain the perimeter partially submerged and the main body of the membrane raised above the water surface. A centrally located aperture is disposed in the membrane to equalize the pressure internal to the membrane with ambient and reduce the pressure therein in response to the low pressure extant the central part of the membrane created by the wind blowing across the raised surface of the membrane.

36 Claims, 14 Drawing Figures

U.S. Patent   Jan. 4, 1983   Sheet 1 of 2   4,366,806
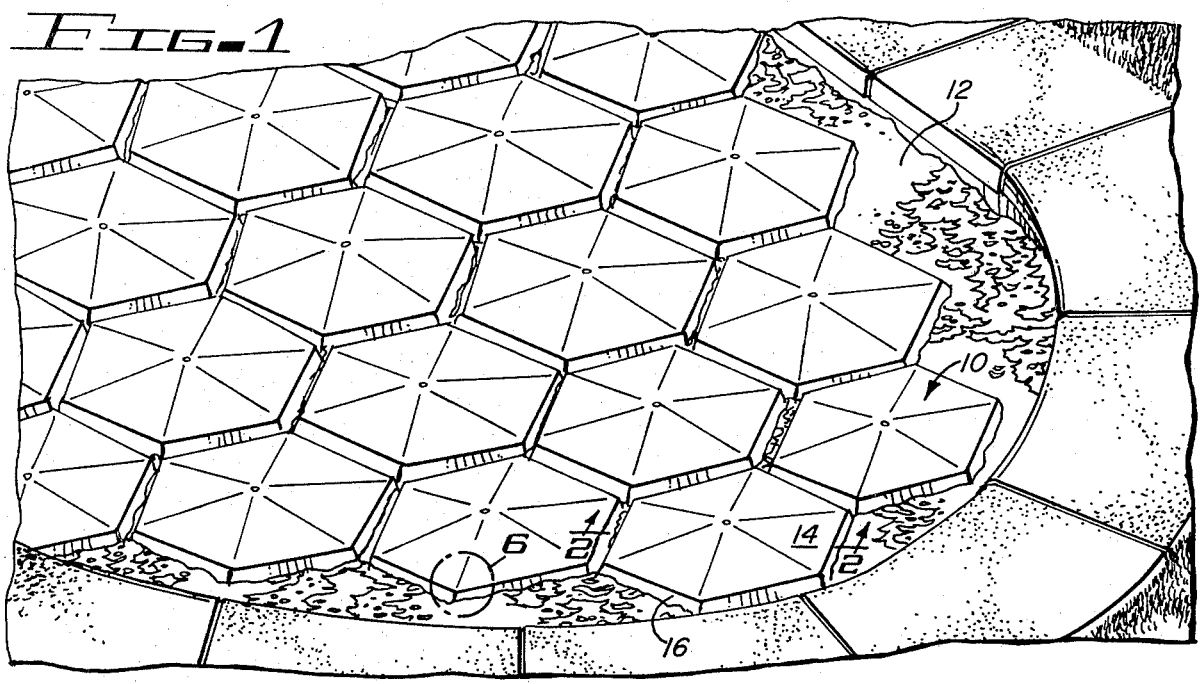
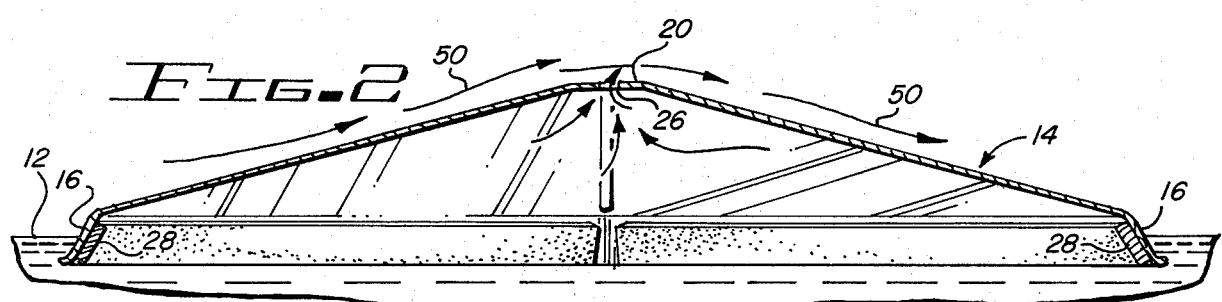
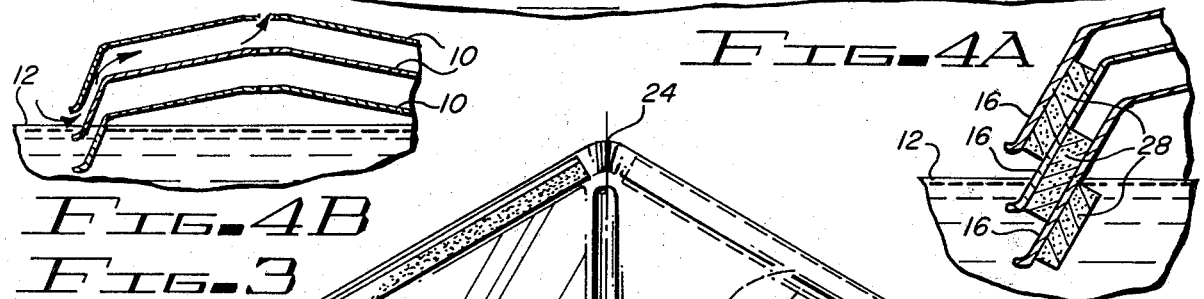
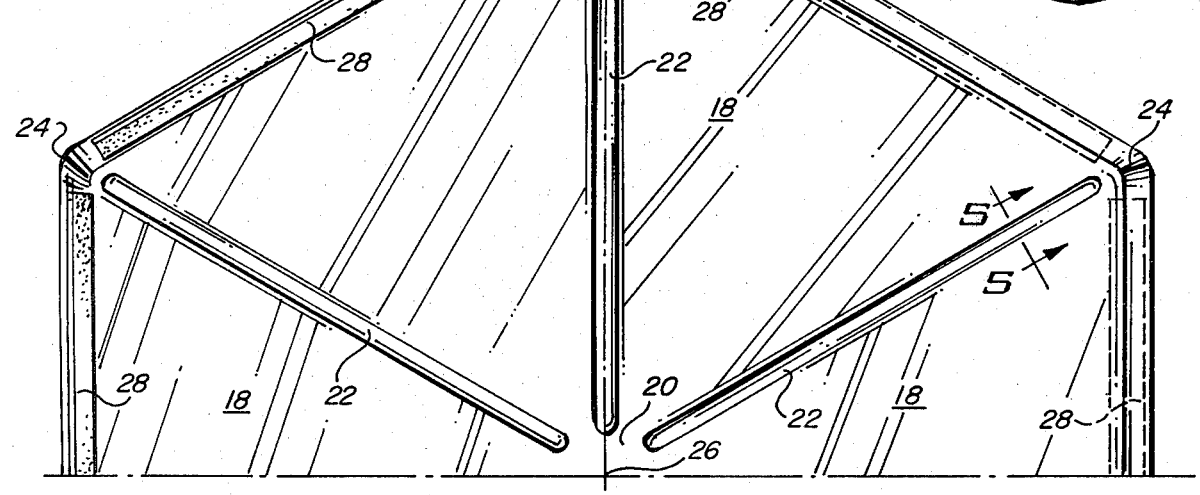

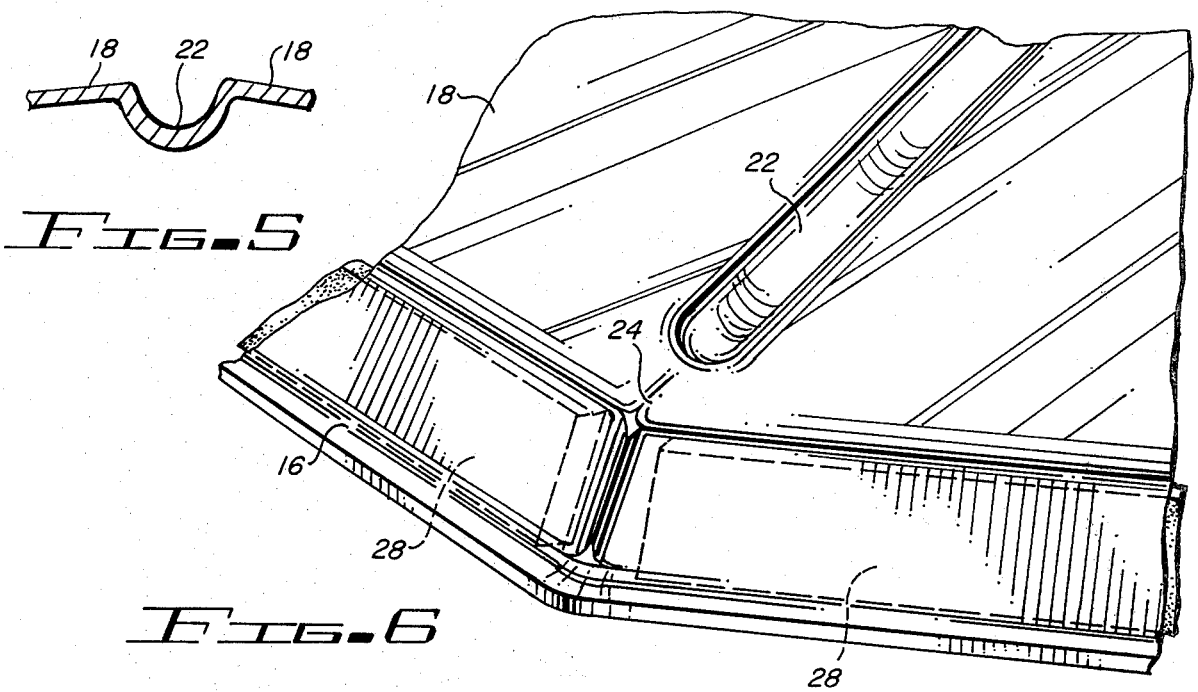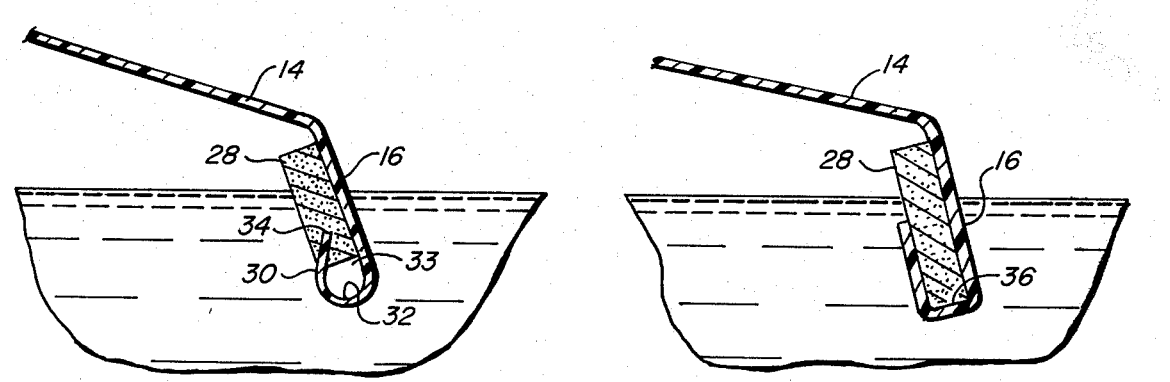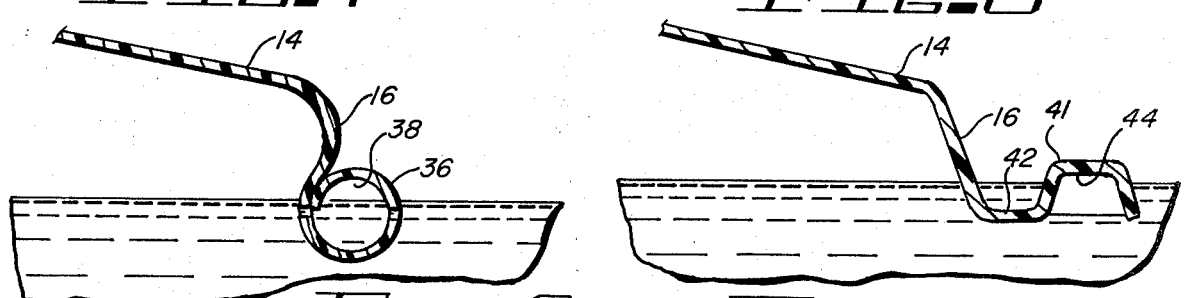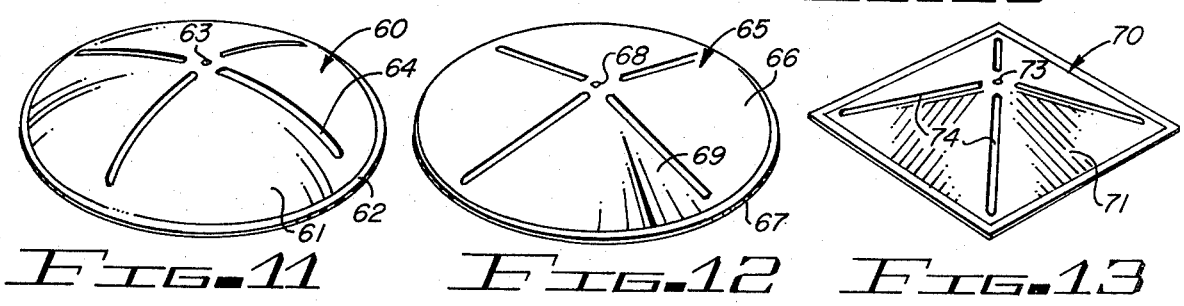

SOLAR POOL HEATER

This application is related to U.S. Pat. No. 4,146,015, entitled "SOLAR POOL HEATER", issued Mar. 27, 1979, and assigned to the present assignee and applications for patents entitled "SOLAR POOL HEATER", filed July 21, 1978, Ser. No. 926,902, now U.S. Pat. No. 4,222,366, and filed Aug. 23, 1979, Ser. No. 68,931, now abandoned, both of which are assigned to the present assignee.

The present invention relates to solar heat collectors and, more particularly, to partially submerged floating pool heaters.

With the high cost of electricity, gas, oil and solid fuels, nonessential uses of electrical power must be abandoned or at least curtailed. The heating of swimming pools, particularly residential swimming pools, is a luxury. For this reason, many communities have refused to issue permits for new installations of pool heating devices which require power from municipal power sources. Moreover, many existing pool heaters have been disconnected or simply not turned on because of the very high attendant utility bills.

Since solar energy is generally abundant wherever pools are normally located, various solar responsive pool heating elements have been developed. The simplest of these devices includes a floating hollow ring secured to the perimeter of a circular sheet of opaque plastic (see U.S. Pat. No. 3,984,881). Such a device floats on top of the water and serves the purpose of reducing heat loss through evaporation of the water and, when heated by the sun, transfers heat by conduction to the underlying water. A more sophisticated device is described in U.S. Pat. No. 3,893,443, wherein a plurality of rectangular shaped hollow devices float upon the surface of the water to partially or completely cover the pool. U.S. Pat. No. 3,984,882 describes a pool heater constructed from a cylindrical section having a sealed annular cavity for flotation and annular depression for lockingly engaging the perimeter of a membrane disposed across one end of the cylindrical section. U.S. Pat. No. 3,949,095 is directed to a plurality of inflatable flotable members serially connected to one another and serving as an elongated cavity for a pumped fluid.

Hollow disc-shaped or rectangular shaped elements floating upon a pool surface are disclosed in U.S. Pat. No. 4,022,187. Similarly functioning but hexagon shaped devices are described in U.S. Pat. No. 3,998,204.

The heating of swimming pools by solar energy has also been achieved through the use of a single cover extending completely or substantially across the pool, as described in the following U.S. Pat. Nos. 3,453,666, 2,964,759, 3,830,676, 3,940,809 and 4,011,607. A device also suitable for this purpose is described in French Pat. No. 7519122.

U.S. Pat. No. 3,949,095 describes one or more rafts in fluid communication with an inflation pump whereby the height of each of the rafts may be raised or lowered with respect to the water surface to optimize collection and retention of heat in a swimming pool.

All of the above devices do, to a greater or lesser extent aid in using solar energy to heat a pool. Moreover, because each of them covers at least a part of the pool surface, retention of heat by precluding the cooling effect of evaporation is accomplished. However, each of the devices which float and are minimally immersed in the pool water are often blown away by a gust of wind. Those devices which are lightweight will, because of wave motion in combination with wind or by wind alone, at least partially overlap one another and thereby preclude maximum surface contact area with the water. The commonly presented horizontal surface or membrane has little self-cleaning capability. As a result, any water splashed thereon will evaporate and leave a deposite which reduces the degree of transparency of the pool heater; dust and particulate matter will also collect thereon and reduce the effective transmissivity of the membrane. Those devices which occupy the complete or major area of the pool in order to operate satisfactorily, generally preclude swimming or other activities within the pool unless they are first removed; they have also been responsible for drownings of persons who have swum beneath them and panicked or become entangled in them. Many of the devices preclude the use of pool cleaners of the skimmer type.

The collection and retention of available solar energy to heat a swimming pool may be segregated into three categories. Night sky radiation constitutes a loss of approximately twenty percent (20%) of the available energy unless curbed. Such radiation, including relatively smaller losses due to conduction and convection, can be curtailed by insulating the pool surface, such as with a film in combination with a layer of air. About thirty percent (30%) of the heat content of a pool can be collected and retained by establishing a so-called "greenhouse" effect by employing a film which is solar energy transmissive and physically displaced off the water surface. This film also prevents reradiation to the atmosphere to retain the heat generated within the enclosure. By eliminating heat losses due to evaporative cooling, approximately fifty percent (50%) of the retained heat is preserved; necessarily, the amount of evaporative cooling is a function of the humidity of the environment. Such evaporative cooling can be curtailed by covering the water surface. Other considerations necessarily attendant solar pool heaters is that of insuring a long useful life of the elements employed despite the deteriorating effects of ultraviolet radiation and other harsh environmental conditions. For practical reasons, any solar pool heater must be easy to handle, easy to use and readily storable by a single individual.

All of the above parameters have been optimized in the elements and structure of the solar pool heater described herein. In the preferred embodiment of the present invention, a hexagonal solar energy transparent centrally upwardly sloping semi-rigid membrane includes an integrally formed depending near upright perimeter wall. Flotation elements are secured to and spaced along the wall to provide flotation capability of about twice the weight of the solar pool heater. An aperture is disposed at the apex of the membrane to equalize the pressure within and without the membrane. Blow off of the solar pool heater is restrained by partial submersion of the perimeter wall during quiescent conditions and by further submersion resulting from a reduction in air pressure within the membrane by the outflow of air through the aperture as a result of wind flow across the apertured apex of the membrane. The semi-rigid quality of the membrane permits it to flex upon application of an upward force applied anywhere to the solar pool heater, which flexing raises a segment of the perimeter wall above the water surface and permits facile lift off of the solar pool heater. The sloping surface forces rapid runoff of water deposited thereon and a washing effect upon any dust or debris which has become deposited thereon. The perimeter wall is at an angle with respect to vertical and accommodates stacking of a plurality of solar pool heaters. The spacing intermediate the flotation elements accommodates a flow of air into the space between the membranes of stacked solar pool heaters and an air outflow occurs through the apertures whereby the resulting convective air flow performs a cooling function to prevent heat buildup. On stacking the solar pool heaters in a pool, one third of them will be submerged, which submersion permits water flow therebetween; the captured water acts as a pendulum weight to prevent tipping of the stack.

Accordingly, it is a primary object of the present invention to provide a partially submerged floating solar pool heater with insulating air space for collecting and retaining solar energy.

Another object of the present invention is to provide a stable pool heater which remains undisturbed by waves or wind.

Still another object of the present invention is to provide stackable self-venting and self-cooling solar pool heaters.

Yet another object of the present invention is to provide a semi-rigid solar pool heater.

A further object of the present invention is to provide a solar pool heater which partially sinks and becomes more firmly anchored in the presence of wind.

A still further object of the present invention is to provide a solar pool heater which is self-cleaning.

A yet further object of the present invention is to provide a solar pool heater which is readily raisable and removeable above the pool water surface by a swimmer to permit the swimmer access to open water surface.

A yet further object of the present invention is to provide a low cost solar pool heater.

A yet further object of the present invention is to provide a solar pool heater which is not constrained from being raised above the water surface by surface tension.

These and other objects of the present invention will become apparent to those skilled in the art as the description thereof proceeds.

The present invention may be described with greater specificity and clarity with reference to the following drawings in which:

FIG. 1 illustrates a plurality of solar pool heaters floating upon the water surface in a pool;

FIG. 2 is a cross-sectional view of a solar pool heater taken along lines 2—2, as shown in FIG. 1;

FIG. 3 is a partial plan view illustrating top and bottom views of sections of the solar pool heater;

FIG. 4a is a cross-sectional view taken along an edge of a plurality of floating stacked pool heaters;

FIG. 4b is a cross-sectional view taken at the corner of a plurality of floating stacked pool heaters;

FIG. 5 is a partial cross-sectional view, taken along lines 5—5, as shown in FIG. 3;

FIG. 6 is a partial view illustrating a corner of the solar pool heater;

FIGS. 7-10 illustrate four variants of the edge of the solar pool heater; and

FIGS. 11-13 illustrate three variants of the plan form of the solar pool heater.

In order to optimally satisfy the various parameters set forth above, a solar pool heater, hereinafter referred to as heater for the brevity, should incorporate the following features: a solar energy transmissive sheet or membrane should be located above the surface to be heated and the underlying air space should be enclosed; the perimeter of the membrane should be partially submerged or otherwise weighted to prevent the heater from tipping and being blown off by the wind; the heater should have an upright perimeter wall to restrain adjacent heaters from riding up on one another; the heaters should be locatable closely adjacent one another to maximize the area covered by a plurality of heaters; the heaters should resist deterioration due to climatological and environmental conditions; the heaters should be readily, physically handlable by an individual; the heaters should be stackable for storage; the heaters should be raisable from the water surface by a swimmer; and, they should be low in cost.

The primary functions of any solar energy collector device includes three functions: first, it should serve as a source of heat receptive to solar radiation; second, it should insulate the heated surface from the chilling effect of wind and during occlusion of the sun; and, third, it should prevent heat losses due to night sky radiation. Many presently known devices provide one or more of these functions but very few satisfy all three to more than a cursory degree. Those devices that do provide all three functions are not necessarily cost effective. That is, the cost of the devices or their maintenance is so substantial that more conventional forms of heat generation may be more practical. This detriment to many existing devices deters wide scale adoption of solar energy as a heat source. Thus, it is mandatory that any solar energy collector device satisfies certain minimum cost effectiveness criteria before it can be accepted as a commercially viable product.

Referring to FIG. 1, there are shown a plurality of solar pool heaters 10 adjacent one another and floating upon water surface 12. Each pool heater includes a membrane 14 having a depending perimeter wall 16. The perimeter wall is upright with respect to the water surface and permits adjacent heaters to abut one another with little tendency of one to overlap another. To maximize the water surface area covered by a plurality of heaters, the plan form of each heater is hexagonal; thus, any interstices between adjacent heaters are minimized, as illustrated. When the pool is occupied and as a result of wave action, pool water may splash upon membranes 14. In addition, rain water will fall upon the membranes. Were this water simply allowed to evaporate, the residue left by such evaporation would have a deleterious effect upon the solar energy transmissivity of the membrane. To reduce the residue buildup and to have the water serve a washing function to remove any dust and debris which may have settled upon the membranes, each membrane slopes radially downwardly from an apex to the top edge of the perimeter wall.

Further details of solar pool heater 10 will be described with joint reference to FIGS. 2, 3, 5 and 6. Membrane 14 is hexagonal in planform and defines six facets 18, each facet being an equilateral triangle sloping downwardly from center apex 20 of the membrane. Each facet is segregated from an adjacent facet by an integrally formed rib or trough 22 extending from in proximity to apex 20 to the proximity of one of corners 24 at the perimeter of the membrane. The troughs serve as stiffening means to aid the membrane in retaining and returning to the configuration illustrated. An aperture 26 is disposed at apex 20 for reasons which will be described in further detail below.

Perimeter wall 16 includes a plurality of flat sides extending intermediate corners 24. Preferably, each perimeter wall slopes approximately sixty degrees with respect to horizontal.

Flotation for solar pool heater 10 is provided by a plurality of foam strips 28, each of which is secured adjacent the interior surface of a perimeter wall 16. These strips extend intermediate adjacent corners 24 but terminate short whereof to provide spacing intermediate adjacent strips. By experimentation and primarily due to the fact that membrane 14 does not rest upon nor come into planar contact with the water surface, flotation sufficient to break the film/water tension of prior art planar pool heaters should submersion occur is not necessary. Therefore, little force is required to break the membrane loose from the water should contact or submersion occur. Accordingly, the flotation capability of the sum of strips 28 need be only approximately twice the weight of the solar pool heater. Thus, under quiescent conditions, perimeter wall 16 will be submerged to the extent that approximately half of the height of strips 28 is submerged, as illustrated in FIG. 2.

Strips 28 may be secured to perimeter wall 16 by mechanical fasteners, such as rivets, straps penetrably engaging aligned apertures in the strips and the perimeter wall, adhesives, etc. The latter however would have to be carefully selected in order to withstand the delaminating propensity of pool water and the potential temperature excursions which the solar pool heater might be subjected to.

Alternate means for securing the strips are illustrated in FIGS. 7 and 8. Lower segment 30 shown in FIG. 7 and being an extension of perimeter wall 16 may be formed bent inwardly and upwardly intermediate corners 24 to define a trough or channel 32. The width of the channel should be commensurate with the thickness of foam strip 28 such that the latter may be placed therein. To retain strip 28 in place, edge 34 may be preformed and biased inwardly so as to frictionally engage the strip and thereby retain the strip within the channel.

To increase the stability of the solar pool heater by weighting the perimeter, channel 32 may be configured such that a void 33 is formed between the lower surface of strip 28 and the bottom of channel 32. This void, on placement of a solar pool heater in the water, would become filled with pool water through apertures along channel 32 or through open ends of the channel. Since leakage from the void would be at a slow rate, the captured pool water would add to the effective weight of the solar pool heater when in use.

The embodiment illustrated in FIG. 8 includes a channel 36 formed as part of perimeter wall 16 which closely approximates the lower cross-section of strip 28. To prevent dislodgment of the foam strip, in the event it is retained only by a low friction force, adhesives or mechanical fasteners may be employed. It may be noted that no specific void or cavity is formed within channel 36 to capture any of the pool water.

FIGS. 9 and 10 illustrate alternate configurations of perimeter 16 to establish both flotation and weighted stability of the solar pool heater. Referring to FIG. 9, it illustrates a lower segment 38 rolled outwardly to form a cylindrical section and to form a void 40. The ends of the cylindrical section may be partially open to permit ingress of water, or they may be sealed and apertures 39 for water flow may be spaced along the sides of the section. The water serves as a weight to anchor the solar pool heater. The upper part of the section will trap air in void 40 to provide flotation capability. To prevent loss of the trapped air due to tilting of the solar pool heater, end walls may be included at the extremities of the cylindrical section.

In the embodiment illustrated in FIG. 10, lower segment 41 of perimeter wall 16 is convoluted laterally to develop a trough 42 and an inverted trough 44. Trough 42 will fill with water to provide stability for the solar pool heater. Inverted trough 44 will trap air and provide flotation for the solar pool heater. Partial or full end walls may be incorporated with inverted trough 44 to preclude loss of the trapped air.

FIGS. 4a and 4b illustrate partial cross-sections of a plurality of stacked solar pool heaters. By forming perimeter wall with a slope of approximately sixty degrees with respect to horizontal, and if foam strips 28 are approximately $\frac{1}{4}''$ thick, compact stacking will result. That is, the spacing intermediate adjacent membranes will be approximately $\frac{1}{2}''$. By test, sixty solar pool heaters have been contained in a 36" high stack.

The air intermediate adjacent membranes in a stack of solar pool heaters will be heated by any radiant energy impinging thereupon. Unless cooled, the temperature within the stack may rise to two-hundred degrees Fahrenheit. As noted earlier, an aperture 26 is formed at apex 20 of each membrane. Any air heated intermediate adjacent membranes will tend, because of normal convection, to rise and it will ultimately out flow through aperture 26 in the next higher adjacent membrane. The outflowing air is replaced by a flow of air entering through the space intermediate corners 24 of adjacent membranes. Thus, a continuous cooling air flow adjacent each membrane and through the stack of solar pool heaters will exist to prevent any heat buildup.

The two to one flotation ratio of strips 28 will, in aggregate, support above water two thirds of the solar pool heaters stacked upon one another in a pool. With respect to the submerged pool heaters, water will precolate intermediate the submerged membranes via the spacing at corners 24 and apertures 26. The water captured will serve in the nature of a pendulum weight such that any attempts to tip the stack, such as under the influence of a prevailing wind, will be countered by a self-righting tendency of the stack; which is much in the nature of a buoy.

To prevent blow off of any exposed solar pool heaters, an impermeable envelope, such as a conventional plastic garbage bag may be used to cover the exposed solar pool heaters. It is therefore evident that the solar pool heaters may be conveniently stored within the pool itself and occupy a surface area no greater than that of a single solar pool heater.

Previously, blow off of solar pool heaters due to wind has always been a problem and various attempts have been made to inhibit or restrain such blow off. With the configuration of membrane 14 illustrated in FIG. 2, an air flow thereacross, as indicated by arrows 50, will increase the velocity of the air traversing apex 26 because the distance across opposed facets 18 from edge to edge is greater than the horizontal distance between the edges. The resulting increased velocity adjacent apex 20 and aperture 26 will reduce the air pressure in proximity to the aperture. The resulting pressure difference between that external to aperture 26 and that internal to membrane 14 will result in an air flow outwardly through the aperture. The resulting lower pressure internal to membrane 14 will cause the solar pool heater to sink by an amount commensurate with the pressure differential. The reduced pressure internal to membrane 14 resulting in further submersion of perimeter 16, will increase the anchoring effect and cause the solar pool heater to more firmly resist lift off from the pool surface in response to the wind. By test, the solar pool heaters described herein have successfully withstood horizontal winds of fifty miles an hour and the above increased submersion phenomenon has been recorded on film.

For short period wind disturbances, such as from whirl winds, the pressure difference between ambient and that internal to membrane 14 (suction) resulting from an attempt to raise the solar pool heater would inhibit lift off. This results because aperture 26 is too small to permit sufficiently rapid pressure equalization.

Pool heaters which have rigid frames disposed about the perimeter of a normally planar horizontal membrane are difficult to raise until a lower edge clears the water surface because of the existing "inverted cup" suction and any film/water tension that may exist. Should a swimmer by mischance swim underwater and attempt to surface beneath such a pool heater, he might have great difficulty in raising the pool heater to draw a breath of air; because of such difficulty, he may panic and drown.

Membrane 14 may be fabricated by vacuum forming a sheet of polycarbonate, such as that known by and sold under the trademark "Lexan". This material is semi-rigid with a good memory which permits it to return to its formed shape after deflection. Moreover, it is highly resistant to aging, scratching, tearing, being jumped upon and other abuse. Moreover, it is very transmissive of radiant solar energy and has outstanding resistance to ultraviolet radiant energy. A solar pool heater built in accordance with the teachings contained herein and fabricated from "Lexan" sheet, will be relatively "floppy" when not uniformly supported along the perimeter or when being lifted out of the water. Because of this beneficial floppiness, were a swimmer to attempt to surface beneath the solar pool heater, a slight upward force upon membrane 14 or anywhere along perimeter wall 16 would tend to cause deflection of the membrane about one or another of troughs 22. Such deflection easily lifts one of corners 24 out of the water. The resulting airflow availability interior of the solar pool heater eliminates any tendency of the solar pool heater to remain on the water pool surface due to suction.

Variants of solar pool heater 10 are illustrated in FIGS. 11-13. All of these variants have the same beneficial features discussed above.

FIG. 11 illustrates a variant 60 of the planform of solar pool heater 10. Herein, membrane 61 is formed as a circular curved convex surface terminated by a depending perimeter wall 62. An aperture 63 is disposed at the apex. Radial ribs or troughs 64 may be incorporated to aid in maintaining the curved surface of membrane 61. Segments of foam strips are attached to perimeter wall 62 in spaced relationship.

FIG. 12 illustrates a variant 65 having a cone-shaped membrane 66 terminating in a depending perimeter wall 67. The perimeter wall supports spaced apart foam strips for flotation. An aperture 68 is disposed at the apex of membrane 66 and a plurality of ribs or troughs 69 extend radially from the apex toward the perimeter wall.

FIG. 13 illustrates variant 70 having a membrane 71 formed in a pyramidal shape and terminating in perimeter wall 72. Spaced foam strips are attached to the perimeter wall for flotation. An aperture 73 exists at the apex of the membrane. Ribs or troughs may extend from a point approximate aperture 73 to a point approximate the corners of perimeter wall 72.

The sloping surface of solar pool heater 10 and any of its variants, will encourage immediate shedding of splashed water and minimize mineral deposits due to evaporation. Any dust or other debris which may have collected upon the membrane tends to be washed off by splashed water or rain. Thereby, the self-cleaning features of the solar pool heater tend to maintain the membrane at maximum transmissivity to solar energy.

It may be noted that the solar pool heater described herein has all of the beneficial heat transmissive and heat retentive properties described earlier and in the referenced patents and applications therefor describing earlier related inventions by the present inventor. More specifically and succinctly: the air cavity within the membrane provides significant insulation from heat loss; the membrane prevents water evaporation and evaporative cooling; the membrane permits efficient transmission of direct high temperature source solar energy rays; and, the membrane precludes re-radiation from the pool water directly back to the night or dark sky.

One tested embodiment of solar pool heater 10 had the following dimensions: the height of apex 26 above the plane of the lower edge of perimeter wall 16 was four and one half inches; the distance across opposed corners was thirty nine inches; the distance across opposed perimeter walls was thirty-five inches; the perimeter walls were eighteen inches long and two inches wide; the foam strips were one quarter of an inch thick, one and one half inches wide and seventeen inches long.

While the principles of the invention have now been made clear in an illustrative embodiment, there will be immediately obvious to those skilled in the art many modifications of structure, arrangement, proportions, elements materials, and components, used in the practice of the invention which are particularly adapted for specific environments and operating requirements without departing from those principles.

I claim:

1. A solar pool heater for heating the water in a pool, said solar pool heater comprising in combination:
   (a) a semi-rigid membrane for defining an air cavity adjacent a circumscribed surface of the water, said membrane including an apex, a surface thereabout sloping downwardly therefrom and a depending perimeter wall;
   (b) means for allowing diametrically oriented flexing of said membrane along predetermined locations in response to non-uniform distribution of upward or downward forces applied to said perimeter wall;
   (c) flotation means disposed upon said perimeter wall for maintaining a portion of said perimeter wall above the surface of the water;
   (d) means for maintaining and urging said apex to a location above said perimeter wall, said maintaining and urging means comprising a plurality of troughs, each of which extends from proximate said perimeter wall to a point proximate said apex; and
   (e) means for venting a flow of air into and out of the air cavity.

2. The solar pool heater as set forth in claim 1 wherein said flotation means comprises strips of bouyant foam material and means for securing said strips to said perimeter wall.

3. The solar pool heater as set forth in claim 2 wherein said securing means comprises mechanical fasteners.

4. The solar pool heater as set forth in claim 2 wherein said securing means comprises a channel formed in said perimeter wall for receiving said strips.

5. The solar pool heater as set forth in claim 4 wherein said channel includes means for holding water to increase the effective weight of said perimeter wall.

6. The solar pool heater as set forth in claim 2 wherein said maintaining and urging means comprises stiffening means radially oriented along said membrane.

7. The solar pool heater as set forth in claim 1 wherein said maintaining and urging means comprises stiffening means radially oriented along said membrane.

8. The solar pool heater as set forth in claim 7 wherein said stiffening means extend from a point proximate said apex to a point proximate said perimeter wall.

9. The solar pool heater as set forth in claim 8 wherein said flotation means comprises strips of bouyant foam material and means for securing said strips to said perimeter wall.

10. The solar pool heater as set forth in claim 1 wherein said perimeter walls slope at an angle of sixty degrees with respect to a plane defined by the lower edge of said perimeter walls.

11. The solar pool heater as set forth in claim 1 wherein said membrane, including said apex, said surface and said perimeter walls are of a single sheet of polycarbonate plastic material.

12. The solar pool heater as set forth in claim 1 wherein said membrane defines a hexagon in planform.

13. The solar pool heater as set forth in claim 12 wherein said perimeter walls include six perimeter walls each of which defines one side of said hexagon and wherein said maintaining and urging means comprises a plurality of troughs, each of which extends from a point proximate a corner of the hexagon to a point proximate said apex.

14. The solar pool heater as set forth in claim 13 wherein said venting means comprises an aperture disposed at said apex.

15. The solar pool heater as set forth in claim 14 wherein said perimeter walls slope at an angle of sixty degrees with respect to a plane defined by the lower edge of said perimeter walls.

16. The solar pool heater as set forth in claim 15 wherein said membrane, including said apex, said surface and said perimeter walls are of a single sheet of polycarbonate plastic material.

17. A solar pool heater for heating the water in a pool, said solar pool heater comprising in combination:
(a) a solar energy transmissive membrane for circumscribing and defining an air cavity adjacent the water surface, said membrane including a depending perimeter wall;
(b) flotation means associated with said perimeter wall for maintaining said membrane sufficiently raised above the water surface to define the air cavity; and
(c) means for submerging said perimeter wall proportionally commensurate with the velocity of any wind blowing across said membrane to more firmly anchor said solar pool heater and increase the resistance of said pool heater to blow off in response to the wind, said submerging means comprising means for increasing the velocity of any air flow across the exterior surface of said membrane as a function of the membrane shape to develop a lower than ambient pressure adjacent the external surface of said membrane and means for inducing a reduction of the pressure within the air cavity interior of the membrane to a lower than ambient pressure, whereby the relative pressure differential between ambient pressure and the pressure within the air cavity will bring about a commensurate submersion of said solar pool heater.

18. The solar pool heater as set forth in claim 17 wherein said velocity increasing means comprises a surface of said membrane configured to slope upwardly from opposed edges of said membrane to an apex and wherein said inducing means comprises an aperture disposed in proximity to said apex.

19. The solar pool heater as set forth in claim 18 wherein said surface slopes downwardly in each direction about said apex toward said perimeter wall.

20. The solar pool heater as set forth in claim 19 wherein said membrane defines a hexagon in planform.

21. The solar pool heater as set forth in claim 20 wherein said membrane, including said apex, said surface and said perimeter walls are of a single sheet of polycarbonate plastic material.

22. The solar pool heater as set forth in claim 20 wherein said membrane is circular in planform.

23. The solar pool heater as set forth in claim 22 wherein said surface is convexly curved.

24. The solar pool heater as set forth in claim 22 wherein said surface is cone-shaped.

25. The solar pool heater as set forth in claim 20 wherein said membrane is square in planform.

26. The solar pool heater as set forth in claim 25 wherein said surface is pyramidal shaped.

27. A solar pool heater for heating the water in a pool, said solar pool heater comprising in combination:
(a) a solar energy transmissive semi-rigid membrane hexagonal in planform for circumscribing and defining an air cavity adjacent the water surface, said membrane including a depending perimeter wall having six serially joined perimeter walls and each junction defining a corner;
(b) flotation means associated with said perimeter wall for maintaining said membrane sufficiently raised above the water surface to define the air cavity;
(c) means for allowing flexing of said membrane and said perimeter wall along predetermined locations to permit raising at least a segment of said perimeter wall above the water surface in response to an upward or downward force applied to said solar pool heater, said flexing means comprising six troughs disposed in said membrane each said trough extending from one of said corners toward the center of said membrane; and
(d) said membrane, said depending walls and said troughs comprising a sheet of polycarbonate plastic material;

whereby, upon application of an upward or downward force, the air cavity comes into direct fluid communication with the ambient air and lift off from the water surface of said solar pool heater is unrestrained by suction.

28. The solar pool heater as set forth in claim 27 wherein said flotation means comprises buoyant foam material secured to at least some of said perimeter walls intermediate adjacent ones of said corners; whereby, said flotation means will not impede flexing along said troughs and said corners.

29. A plurality of stackable solar pool heaters, each of said solar pool heaters comprising in combination:
   (a) a solar energy transmissive semi-rigid membrane for circumscribing and defining an air cavity adjacent the water surface, said membrane including an apex having an aperture, a surface extending about said apex and sloping downwardly therefrom and a perimeter;
   (b) flotation means disposed adjacent said perimeter for maintaining said membrane sufficiently above the water surface to form the air cavity;
   (c) means for nesting said solar pool heaters to form a stack of said solar pool heaters;
   (d) means for channeling a flow of air intermediate adjacent ones of said membranes upon stacking of said solar pool heaters which air flow cools said membranes and precludes heat build up within the stacked ones of said solar pool heaters, said channeling means accommodating an inflow of water intermediate stacked and submerged or partially submerged ones of said solar pool heaters to stabilize and prevent tipping of a plurality of said solar pool heaters stacked and floating in water.

30. The solar pool heater as set forth in claim 29 wherein said channeling means includes said nesting means.

31. The solar pool heater as set forth in claim 30 wherein said nesting means includes a perimeter wall depending from said perimeter and sloping at an angle with respect to horizontal; whereby, on stacking said solar pool heaters the perimeter walls of adjacent solar pool heaters will overlap one another and nest.

32. The solar pool heater as set forth in claim 31 wherein said flotation means is secured to said perimeter wall to bear against the perimeter wall of an adjacent nested solar pool heater and maintain the respective membranes in spaced relationship to one another.

33. The solar pool heater as set forth in claim 32 wherein said flotation means comprises segments of bouyant foam material.

34. The solar pool heater as set forth in claim 33 wherein said segments are spaced apart from one another along the respective perimeter wall to provide an ingress for air or water intermediate said membranes.

35. The solar pool heater as set forth in claim 34 wherein said channeling means includes said aperture disposed at said apex for providing egress of the air flowing intermediate said membranes.

36. The solar pool heater as set forth in claim 32 wherein the amount of said flotation means of each of said solar pool heaters has a bouyant force of twice the weight of said solar pool heater; whereby one third of a stack of said solar pool heaters placed in a pool will be submerged.

* * * * *